July 10, 1923.
J. M. COBURN ET AL
1,461,267
VALVE GRINDER
Filed Nov. 14, 1921
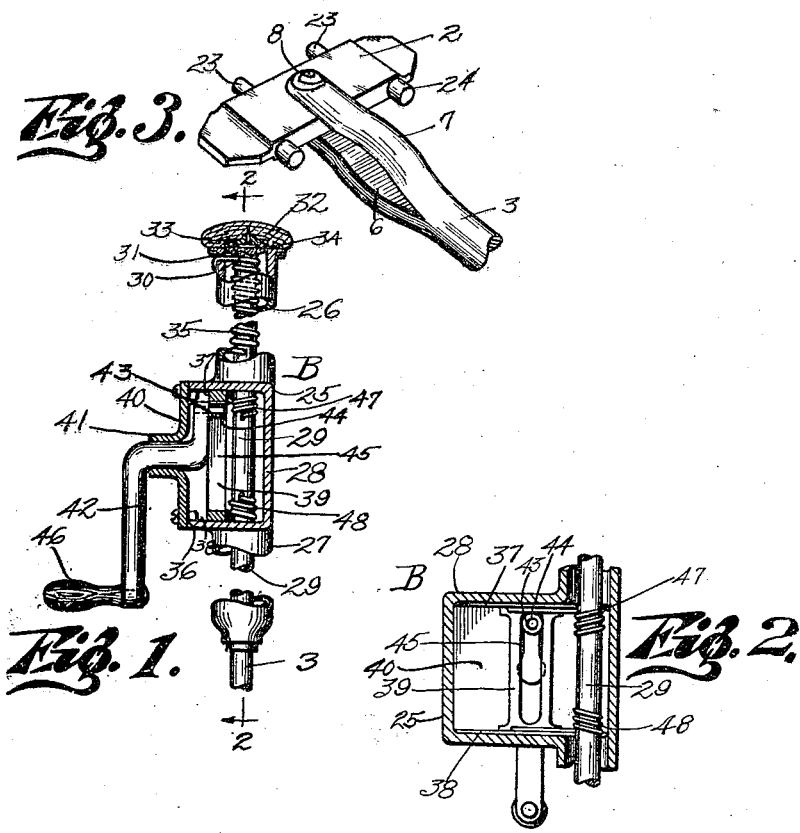
INVENTORS,
John M. Coburn,
John M. McCrary,
BY Raymond Ives Blakeslee
ATTORNEY.

Patented July 10, 1923.

1,461,267

UNITED STATES PATENT OFFICE.

JOHN M. COBURN AND JOHN M. McCRARY, OF LONG BEACH, CALIFORNIA.

VALVE GRINDER.

Application filed November 14, 1921. Serial No. 515,061.

*To all whom it may concern:*

Be it known that we, JOHN M. COBURN and JOHN M. McCRARY, citizens of the United States, residing at Long Beach, in the county of Los Angeles and State of California, have jointly invented new and useful Improvements in Valve Grinders, of which the following is a specification.

This invention relates to valve grinders, and has for an object the provision of a valve grinder which is simple in construction, neat in appearance, and inexpensive in manufacture, and has utility, durability and general efficiency and serviceability.

The invention has for further objects the provision of a valve grinder which can be operated in various positions without unduly cramping the operator.

In the drawing:

Figure 1 is a fragmentary view, certain parts being in section, of our valve grinder;

Figure 2 is a fragmentary cross sectional view of the mechanism for operating the grinder shown in Figure 1, and taken on the line 2—2 of Figure 1 and looking in the direction of the appended arrows; and, Figure 3 is a fragmentary perspective view of a valve engaging shoe associated with the spindle of the valve grinder.

Corresponding parts in all the figures are designated by the same reference characters B designates as an entirety the improved valve grinder. In particular the device B includes a housing 25 which includes two annular members 26 and 27, with an enlarged housing or casing 28 between said annular members. The casing 28 is adapted to receive mechanism for rapidly rotating or reciprocating a shaft or spindle member 29, which extends through the annular members 26 and 27 and the casing 28, and one end thereof as 30 carries a member 31 provided with a ball race. A handle member 32 detachably secured to an end of the annular member 26 carries a member 33 provided with a ball race and roller members 34 are interposed between the members 31 and 33 and in the ball races thereof. The lowermost end of the spindle or shaft 29 may be provided with a valve engaging shoe 2. A coil spring 35 surrounds the shaft 29 and has one end secured to said shaft, while the other end is attached to the annular member 26. The casing 28 is open on one side as at 36 and the interior of said casing is formed with grooves 37 and 38. A longitudinally slotted member or Scotch yoke 39 is adapted to be received within said grooves and to be guided in its movement by said grooves. A plate 40 is detachably secured to the casing 28 and the plate is provided with a bushing 41 through which a crank handle 42 is adapted to pass. The crank handle 42 is Z-shaped, as shown, and an end 43 of said handle carries a roller member 44 which is normally confined in the slot 45 of the member 39. If the crank 42 were rotated by grasping a handle 46 the roller 44 would move within the slot and tend to reciprocate the member 39 back and forth within the casing 28. Strap members 47 and 48 have one of their ends attached to the shaft, with a portion of each strap wrapped around the shaft as shown in the figures. The other ends of said straps are fastened to the member 39. As a result, when an operator grasps the handle 46 a half revolution of the crank arm will move the member 39 and will rotate the shaft in one direction, the spring member 35 rotating the shaft and moving said member in an opposite direction, during the other half revolution of the crank handle 42. The spindle 3 has a bifurcated extremity as shown at 6 and 7, and pivoted between said extremities by means of a suitable pin 8, is a valve-engaging shoe 2. The valve-engaging shoe 2 is provided with prongs 23 and 24 and likewise with screw-driver ends 50 and 51. This renders the shoe universal in its adaptation in that it may fit various forms of valves simply by rotating the same to different positions relative to the spindle 3.

It is obvious that many changes and variations and modifications may be made in departure from the particular description and showing of the accompanying drawing, in adapting the invention to varying conditions of use and service, without departing from the true spirit of the invention.

Having thus disclosed our invention, we claim and desire to secure by Letters Patent:

1. In a valve grinder, the combination; of a housing formed with a longitudinal bore, a spindle adjustably carried by the housing within said bore; said spindle being provided with a bifurcated extremity, a rotatable valve engaging shoe carried by the spindle in the bifurcations; and means for giving said spindle rotary reciprocation; said means including a spring adapted to rotate the spindle in one direction, and a strap adapted to be coiled about the spindle to rotate the spindle in the opposite direction; there being a Scotch yoke to which the strap is connected at one end, and means for guiding and reciprocating said yoke.

2. In a valve grinder, the combination: of a housing formed with a longitudinal bore, a spindle adjustably carried by the housing within said bore; a valve-engaging shoe carried by the spindle; and means for effecting rotary reciprocation of said spindle; said means including a tension member adapted to rotate the spindle in one direction, a Scotch yoke, and means between the Scotch yoke and spindle for rotating said spindle under resistance of said tension member.

In testimony whereof, we have signed our names to this specification in the presence of two subscribing witnesses.

JOHN M. COBURN.
JOHN M. McCRARY.

Witnesses:
J. CALVIN BROWN,
J. SHUTT.